United States Patent
Lee et al.

(10) Patent No.: US 8,962,103 B2
(45) Date of Patent: Feb. 24, 2015

(54) LIQUID CRYSTAL FILM

(75) Inventors: Dae Hee Lee, Daejeon (KR); Jun Won Chang, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 109 days.

(21) Appl. No.: 13/521,703

(22) PCT Filed: Nov. 10, 2011

(86) PCT No.: PCT/KR2011/008588
§ 371 (c)(1),
(2), (4) Date: Jul. 11, 2012

(87) PCT Pub. No.: WO2012/064137
PCT Pub. Date: May 18, 2012

(65) Prior Publication Data
US 2012/0320306 A1    Dec. 20, 2012

(30) Foreign Application Priority Data

Nov. 10, 2010  (KR) .................. 10-2010-0111752
Nov. 10, 2010  (KR) .................. 10-2010-0111753
Nov. 10, 2011  (KR) .................. 10-2011-0117225

(51) Int. Cl.
*G02B 5/30* (2006.01)
*C09K 19/54* (2006.01)
*C09K 19/38* (2006.01)
*G02F 1/1335* (2006.01)
*C09K 19/04* (2006.01)

(52) U.S. Cl.
CPC ............ *G02B 5/3025* (2013.01); *G02B 5/3016* (2013.01); *G02F 1/13362* (2013.01); *C09K 2019/0448* (2013.01); *C09K 2219/03* (2013.01); *G02F 2201/343* (2013.01)
USPC ......... 428/1.1; 428/1.31; 252/299.5; 349/193

(58) Field of Classification Search
CPC ................... C09K 2019/0448; C09K 2219/03; G02B 30/3016; G02B 30/3025; G02F 1/3362; G02F 2201/343
USPC .............. 252/299.5, 299.7; 349/193; 428/1.1, 428/1.31
See application file for complete search history.

(56) References Cited

U.S. PATENT DOCUMENTS 6,259,496 B1 *  7/2001  Kashima ..................... 349/62
2006/0127605 A1 *  6/2006  Takeda et al. ................. 428/1.3
(Continued)

FOREIGN PATENT DOCUMENTS

CN    1298422 A    6/2001
CN    1701251 A    11/2005
(Continued)

OTHER PUBLICATIONS

Machine translation of KR 10-2010-0047571, 2010.*
(Continued)

*Primary Examiner* — Shean C Wu
(74) *Attorney, Agent, or Firm* — McKenna Long & Aldridge, LLP

(57) ABSTRACT

A liquid crystal film (LCF), a method of manufacturing the same, an optical device, or an LCD is provided. The exemplified LCF can be used as a reflective polarization plate, which can improve luminance and light utilization efficiency of a display device, such as an LCD, and the like.

17 Claims, 7 Drawing Sheets

(56) References Cited

U.S. PATENT DOCUMENTS

| | | | |
|---|---|---|---|
| 2006/0209238 A1* | 9/2006 | Shiraogawa et al. | 349/115 |
| 2010/0225857 A1* | 9/2010 | Lu et al. | 349/98 |
| 2010/0231830 A1* | 9/2010 | Hirakata et al. | 349/85 |
| 2012/0224126 A1* | 9/2012 | Chang et al. | 349/117 |

FOREIGN PATENT DOCUMENTS

| | | |
|---|---|---|
| JP | 2000-84509 A | 3/2000 |
| JP | 2001-249225 A | 9/2001 |
| JP | 2003-84131 A | 3/2003 |
| JP | 2003-215342 A | 7/2003 |
| JP | 2005-37657 A | 2/2005 |
| JP | 2005-106945 A | 4/2005 |
| JP | 2006-293393 A | 10/2006 |
| JP | 2007-148158 A | 6/2007 |
| KR | 10-2001-0033458 | 4/2001 |
| KR | 10-2007-0069512 | 7/2007 |
| KR | 10-2011-0051027 | 2/2011 |
| TW | 2003-06443 | 11/2003 |

OTHER PUBLICATIONS

Machine translation of KR 10-2001-0033458, 2001.*
Machine trnalation of KR 10-2007-0069512, 2007.*
English translation by computer for JP 2006-293393, http://www4.ipdl.inpit.go.jp/Tokujitu/PAJdetail.ipdl?N0000=60&N0120=01&N2001=2&N3001=2006-293393.*

* cited by examiner

LIQUID CRYSTAL FILM

This application is a National Stage Entry of International Application No. PCT/KR2011/008588, filed Nov. 10, 2011, and claims the benefit of Korean Application Nos. 10-2010-0111752, filed on Nov. 10, 2010, 10-2010-0111753, filed on Nov. 10, 2010, and 10-2011-0117225, filed on Nov. 10, 2011, which are hereby incorporated by reference in their entirety for all purposes as if fully set forth herein.

BACKGROUND

1. Field of the Invention

The present invention relates to a liquid crystal film, a method of manufacturing the same, an optical device, and a liquid crystal display.

2. Discussion of Related Art

A liquid crystal display (LCD) may include a liquid crystal panel, and polarization plates disposed on the upper and lower sides of the liquid crystal panel, and may include various functional optical devices in addition to the polarization plates.

An LCD can display an image by changing an alignment of liquid crystal molecules in each pixel of the liquid crystal panel. Since an LCD is not a self-emissive device, a light source, such as a backlight unit (BLU), and the like, is generally disposed on the rear surface of a polarization plate disposed on the lower side of the liquid crystal panel, and an image is displayed by penetrating light emitted from the light source through the panel.

SUMMARY OF THE INVENTION

The present invention is directed to providing a liquid crystal film (LCF), a method of manufacturing the same, an optical device, and an LCD.

The present invention relates to an LCF. An exemplified LCF includes a liquid crystal layer including a cholesteric-aligned liquid crystal area (hereinafter referred to as a "CLC layer"). The liquid crystal area is a CLC area with a helical structure, in which a director of a liquid crystal molecule is twisted along a helical axis to form a layer and align, and the CLC layer includes at least two of the liquid crystal areas mentioned above.

The liquid crystal area includes a CLC area, of which the helical axis of the area is formed to be parallel to a thickness direction of the CLC layer; and a CLC crystal area, of which the helical axis of the area is formed not to be parallel to the thickness direction of the CLC layer.

The term, "a thickness direction of the CLC layer" in the present specification may refer to a direction parallel to a hypothetical line that connects one main surface of the CLC layer and the opposing main surface thereof in the shortest distance. In an example, when the LCF further includes a substrate and the CLC layer is formed on one side of the substrate to be described below, the thickness direction of the CLC layer may be a direction parallel to a hypothetical line that is formed in a direction perpendicular to a side of the substrate that has the CLC layer.

For an angle definition in the present specification, when terms such as verticality, horizontality, orthogonality, or parallel are used, they refer to verticality, horizontality, orthogonality, or parallel within a range that does not damage the desired effects. For example, they include errors that consider manufacturing error, variation, and the like. For example, each case may include an error of less than about ±15°, an error of less than about ±10°, or an error of less than about ±5°.

The CLC layer includes a CLC area. For the present specification, the cholesteric liquid crystal or cholesteric-aligned liquid crystal may be abbreviated to "CLC." Referring to FIG. 1, the CLC has a helical structure, in which a director of a liquid crystal molecule (n in FIG. 1) is twisted along a helical axis (X in FIG. 1) to form a layer and align. In the CLC structure, the distance to complete a 360-degree revolution by the director of the liquid crystal molecule (P in FIG. 1) is called a "pitch." For the present specification, the term, "liquid crystal area or CLC area" may mean an area to complete a 360-degree revolution by the director of the CLC. Each CLC area in the present specification may be classified according to an alignment type or angle of the helical axis of the area to the thickness direction of the CLC layer, or a center wavelength of reflected light of each liquid crystal area.

The CLC may selectively reflect light of circularly polarized light. The wavelength of light reflected by the CLC depends on a pitch and a refractive index of the liquid crystal. A helical twist of the CLC director allows a periodic deformation spatially in a dielectric tensor of a material, thereby selectively reflecting the wavelength of light. Generally, Bragg reflection occurs in light propagated along a helical axis for the CLC when a wavelength λ is within the range of the following Formula 1:

$$N_o P < \lambda < N_e P \qquad \text{[Formula 1]}$$

where, P is a pitch of CLC area; $N_e$ is a refractive index of the CLC to light parallel-polarized to the director of the CLC; and $N_o$ is a refractive index of the CLC to light vertically polarized to the director of the CLC.

In addition, a center wavelength $\lambda_0$ with the wavelength range of light reflected by CLC may be approximated by the following Formula 2:

$$\lambda_0 = 0.5(N_o + N_e)P \qquad \text{[Formula 2]}$$

where, P, $N_e$ and $N_o$ are as defined in Formula 1.

In addition, a spectral width $\Delta\lambda_0$ of light reflected by the CLC may be approximated by the following Formula 3:

$$\Delta\lambda_0 = 2\lambda_0(N_e - N_0)/(N_o + N_e) = P(N_e - N_o) \qquad \text{[Formula 3]}$$

where, P, $N_e$ and $N_o$ are as defined in Formula 1.

The liquid crystal area of the CLC layer includes a CLC area having a helical axis in a direction parallel to the thickness direction of the CLC layer and a CLC area having a helical axis in the direction not parallel to the thickness direction of the CLC layer.

Referring to FIG. 2, the arrangement of the helical axis of the CLC area is illustrated by example as follows.

Generally, the CLC area includes a CLC molecule rotating helically, but is arranged so that the director of the CLC molecule, for example, the helical axis of the major axis of the CLC molecule, is parallel to the thickness direction of the CLC layer. In this general case, the CLC area is aligned so that a helical axis HA of the CLC is parallel to a thickness direction 21 of the CLC layer as shown in A of FIG. 2. In FIG. 2, a direction 22 perpendicular to the thickness direction 21 may mean, for example, a plane direction of the substrate as mentioned above. For the present specification, the CLC area, in which the helical axis is aligned in a parallel state to the thickness direction of the CLC layer as mentioned above, may be called a planar-aligned CLC area.

According to an alignment condition of the CLC, or a side property of the substrate that has the CLC, the helical axis of the director of the CLC molecule may be arranged in the direction not parallel to the thickness direction of the CLC layer. For example, the alignment may be such that the helical axis HA of the CLC is aligned in a direction perpendicular to the thickness direction 21 of the CLC layer as shown in B of FIG. 2 and the helical axis HA of the CLC is aligned in a direction other than the directions perpendicular and parallel to the thickness direction of the CLC layer as shown in C of FIG. 2. For the present specification, as mentioned above, the CLC area, of which the helical axis is aligned perpendicularly to the thickness direction of the CLC layer, may be called a homeotropic-aligned CLC area and the CLC area, of which the helical axis is aligned in the direction other than the directions perpendicular and parallel to the thickness direction of the CLC layer may be called a focal conic-aligned CLC area.

The CLC area in the CLC layer formed in a general way is aligned so that the helical axis is parallel to the thickness direction of the CLC layer. However, the CLC layer of the LCF may include the CLC area, of which the helical axis is artificially formed in a direction other than the direction parallel to the thickness direction of the CLC layer. The CLC area, of which the helical axis is formed in a direction other than the direction parallel to the thickness direction of the CLC layer, allows light incident to the CLC layer to be scattered or diffused so that luminance and viewing angle properties of the LCF can be improved.

An amount, a location, and a distribution state of the homeotropic- or focal conic-aligned CLC area in the CLC layer are not specifically limited, nor is the angle of the helical axis limited to the thickness direction in the focal conic-alignment, etc. In an example, the homeotropic- or focal conic-aligned CLC area may be formed and arranged so that the CLC layer allows light to be scattered or diffused due to the area, and thus the haze of the CLC layer falls within a predetermined range. In an example, the CLC layer including the homeotropic- or focal conic-aligned CLC area as mentioned above may have a haze value of at least 5%, at least 10%, or at least 15%. The haze value of the CLC layer may be selected to create an effect most suitable for each application according to the use to which the LCF is applied. A haze value of the CLC layer may be measured according to a manufacturer's manual using a hazemeter, for example, such as HR-100 or HM-150 available from Sepung. In addition, an upper limit of the haze of the CLC layer may be for example, about 30%, 25%, or 20%, but is not specifically limited thereto.

Also, the CLC layer may include at least two types of CLC areas, of which the center wavelengths of the reflected light are different from each other. The CLC layer including at least two types of the CLC areas may be a single layer. For the present specification, a CLC layer that is formed by stacking or attaching at least two CLC layers or a CLC layer that is formed by coating a CLC composition a plurality of times to form the CLC layer, etc., is not included in the CLC layer of the single layer. As mentioned above, when the CLC layer including at least two types of the CLC areas is formed in a single layer structure, a selective reflection property can be secured in a wide wavelength width with a thinner thickness, and also a reflection loss of light due to an interface between layers can be prevented. For the present specification, the CLC layer which is the single layer, the CLC layer includes at least two types of the CLC areas having different center wavelengths of the reflected light as mentioned above may be called a CLC layer having a wideband property.

Each of the CLC areas that is classified according to the center wavelength of the reflected light may be a planar-, homeotropic-, or focal conic-aligned CLC area.

When the CLC layer includes at least two types of the CLC areas with the different center wavelengths of the reflected light, the distribution of each CLC area is not particularly limited. In an example, the CLC areas may be arranged so that the center wavelength is successively changed from long-wavelength to short-wavelength or from short-wavelength to long-wavelength; may be arranged so that the center wavelength is successively changed in the direction from being shorter and then longer, or successively changed in the direction from being longer and then shorter; or may be arranged so that the center wavelength is irregularly changed along the thickness direction of the CLC layer.

In an example, the CLC layer may include at least a CLC area whose center wavelength of reflected light belongs to a red-light area of the visible spectrum; a CLC area whose center wavelength of the reflected light belongs to a green-light area of the visible spectrum; and a CLC area whose center wavelength of the reflected light belongs to a blue-light area of the visible spectrum.

FIG. 3 is a schematic diagram showing a CLC layer 2 in the abstract, illustrating an example in which a CLC area 231 whose center wavelength of the reflected light belongs to the red-light area, a CLC area 232 whose center wavelength of the reflected light belongs to the green-light area, and a CLC area 233 whose center wavelength of the reflected light belongs to the blue-light area are successively arranged in a direction from one main surface 21 side to another main surface 22 side of the CLC layer 2.

The CLC layer may include at least a first area of which a center wavelength of the reflected light of 400 nm to 500 nm, a second area of which a center wavelength of the reflected light of 500 nm to 600 nm, and a third area of which a center wavelength of the reflected light of 600 nm to 700 nm. The first to third areas may be arranged in a direction in which the center wavelength successively increases or in which the center wavelength successively decreases along the thickness direction of the CLC layer, but are not limited thereto. In addition, the center wavelength of the reflected light may be measured, for example based on Formula 2, and the method of measuring the center wavelength is widely known in the related art.

In an example, the CLC layer may include a liquid crystal polymer. An exemplified method of manufacturing the CLC layer may include coating a composition including a crosslinking or polymeric liquid crystal compound and a chiral agent, and polymerizing or crosslinking the composition in a state inducing a helical pitch by the chiral agent, and in this case, the CLC layer may include a crosslinked or polymerized liquid crystal polymer. The chiral agent may be crosslinkable or polymeric, or non-crosslinkable or non-polymeric.

One exemplified CLC layer may include a compound represented by the following Chemical Formula 1 in a crosslinked or polymerized form:

[Chemical Formula 1]

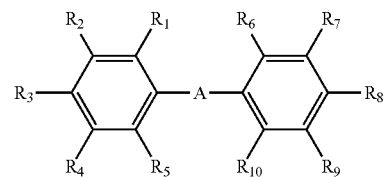

where, A is a single bond, —COO—, or —COO—; and $R_1$ to $R_{10}$ are independently hydrogen, a halogen, an alkyl group, an alkoxy group, a cyano group, a nitro group, —O-Q-P, or a substituent of the following Chemical Formula 2, respectively, with the proviso that at least one of $R_1$ to $R_{10}$ is —O-Q-P or a substituent of the following Chemical Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

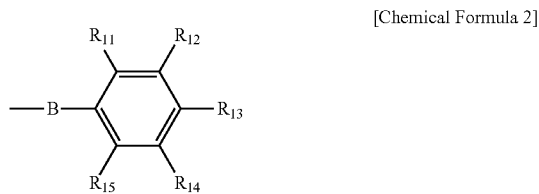

[Chemical Formula 2]

where, B is a single bond, —COO—, or —COO—; and $R_{11}$ to $R_{15}$ are independently hydrogen, a halogen, an alkyl group, a alkoxyl group, a cyano group, a nitro group, or —O-Q-P, respectively, with the proviso that at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

The left side, "-" of B in Chemical Formula 2 means that B directly binds to benzene of the Chemical Formula 1.

The term, "a single bond" in Chemical Formula 1 and Chemical Formula 2 means that there is no special atom at the part marked with A or B. For example, when A of Chemical Formula 1 is a single bond, benzenes of both sides of A may be directly bound to form a biphenyl structure.

In Chemical Formula 1 and Chemical Formula 2, the halogen may be, for example, chlorine, bromine, or iodine.

In Chemical Formula 1 and Chemical Formula 2, the alkyl group may be, for example, a $C_1$ to $C_{20}$, $C_1$ to $C_{16}$, $C_1$ to $C_{12}$, $C_1$ to $C_8$, or $C_1$ to $C_4$ straight or branched chain alkyl group, or a $C_3$ to $C_{20}$, $C_3$ to $C_{16}$, or $C_4$ to $C_{12}$ cycloalkyl group. In addition, the alkyl group may be randomly substituted with at least one substituent.

In Chemical Formula 1 and Chemical Formula 2, the alkoxy group may be, for example, a $C_1$ to $C_{20}$, $C_1$ to $C_{16}$, $C_1$ to $C_{12}$, $C_1$ to $C_8$, or $C_1$ to $C_4$ alkoxy group. The alkoxy group may have a straight chain, branched chain, or circular structure. In addition, the alkoxy group may be randomly substituted with at least one substituent.

In addition, in Chemical Formula 1 and Chemical Formula 2, the alkylene group or alkylidene group may be, for example, a $C_1$ to $C_{12}$, $C_4$ to $C_{10}$, or $C_6$ to $C_9$ alkylene group or alkylidene group. The alkylene group or alkylidene group may have a straight chain, branched chain, or circular structure. In addition, the alkylene group or alkylidene group may be randomly substituted with at least one substituent.

In addition, in Chemical Formula 1 and Chemical Formula 2, the alkenyl group may be, for example, a $C_2$ to $C_{20}$, $C_2$ to $C_{16}$, $C_2$ to $C_{12}$, $C_2$ to $C_8$, or $C_2$ to $C_4$ alkenyl group. The alkenyl group may have a straight chain, branched chain, or circular structure. In addition, the alkenyl group may be randomly substituted with at least one substituent.

The substituent for the alkyl group, alkoxy group, alkenyl group, alkylene group, or alkylidene group may be, for example, an alkyl group, an alkoxy group, an alkenyl group, an epoxy group, a cyano group, a carboxyl group, an acryloyl group, a methacryloyl group, an acryloyloxy group, a methacryloyloxy group, an aryl group, and the like, but is not limited thereto.

In addition, in Chemical Formula 1 and Chemical Formula 2, P may be preferably an acryloyl group, a methacryloyl group, an acryloyloxy group, or a methacryloyloxy group; more preferably, an acryloyloxy group or a methacryloyloxy group; and most preferably, an acryloyloxy group.

In Chemical Formula 1 and Chemical Formula 2, —O-Q-P or a residue of Chemical Formula 2, of which at least one may be present, may be present at the site of $R_3$, $R_8$, or $R_{13}$, and for example, may be one or two. In addition, a substituent other than —O-Q-P or the residue of Chemical Formula 2 in a compound of Chemical Formula 1 or a residue of Chemical Formula 2 may be, for example, hydrogen, a halogen, a $C_1$ to $C_4$ straight chain or branched chain alkyl group, a $C_4$ to $C_{12}$ cycloalkyl group, a cyano group, a $C_1$ to $C_4$ alkoxy group, a cyano group, or a nitro group, and preferably, chlorine, a $C_1$ to $C_4$ straight chain or branched chain alkyl group, a $C_4$ to $C_{12}$ cycloalkyl group, a $C_1$ to $C_4$ alkoxy group, or a cyano group.

When the chiral agent that can be included in the CLC layer does not damage liquid-crystallinity of the liquid crystal polymer or liquid crystal compound, for example, nematicity, and induces a desired helical pitch, it may be used without particular limitation. The chiral agent for inducing the helical pitch to the liquid crystal needs to include at least chirality in the molecular structure. The chiral agent may be, for example, a compound one or two or more asymmetric carbons, a compound with an asymmetric point on a hetero atom, such as chiral amine, chiral sulfoxide, and the like, or a compound with an axially asymmetric, optically active site having axial asymmetry, such as cumulene, binaphthol, and the like. The chiral agent may be, for example, a low molecular compound with a molecular weight of 1,500 or less. For example, the chiral agent may include a commercial chiral nematic liquid crystal, for example, Chiral Dopant Liquid Crystal S-811 available from Merck, LC756 available from BASF, and the like.

The CLC layer may have, for example, a thickness of 3 μm to 8 μm or 4 μm to 6 μm. The homeotropic- or focal conic-aligned CLC area may be effectively formed in the CLC layer, or the film may be effectively applied for various uses by controlling the thickness of the CLC layer to be in the above range.

In an example, the LCF may further include a substrate and the CLC layer may be formed on at least one side of the substrate.

FIG. 4 is a cross-sectional diagram showing an exemplified LCF 4, in which the above-mentioned CLC layer 41 is formed on an upper side of a substrate 42.

Various types of substrates may be used as the substrate. In an example, the substrate may be an optically isotropic substrate, an optically anisotropic substrate, such as a retardation layer, and the like, a polarization element, and the like.

The optically isotropic substrate may be a transparent substrate, such as a glass substrate, a transparent plastic substrate, and the like. The plastic substrate may be, for example, a cellulose substrate, such as a diacetyl cellulose (DAC) or a triacetyl cellulose (TAC) substrate; a cyclo olefin copolymer (COP) substrate, such as a norbornene derivative resin substrate, and the like; an acryl substrate, such as a poly(methyl methacrylate) (PMMA) substrate, and the like; a polycarbonate (PC) substrate; an olefin substrate, such as a polyethylene (PE) or polypropylene (PP) substrate, and the like; a polyvinyl alcohol (PVA) substrate; a poly ether sulfone (PES) substrate; a polyetheretherketone (PEEK) substrate; a polyetherimide (PEI) substrate; a polyethylenenaphthatlate (PEN)

substrate; a polyester substrate, such as a polyethyleneterephtalate (PET) substrate, and the like; a polyimide (PI) substrate; a polysulfone (PSF) substrate; a polyarylate (PAR) substrate, a fluororesin substrate, and the like. The substrate may be, for example, a sheet or film.

The optically anisotropic substrate, for example, the retardation layer, may be, for example, a $\lambda/4$ wavelength layer, a $\lambda/2$ wavelength layer, and the like. The term, "$\lambda/4$ wavelength layer" in the present specification may refer to an optical device that allows incident light to retardate down to ¼ of the wavelength and the term, "$\lambda/2$ wavelength layer" in the present specification may refer to an optical device that allows incident light to retardate down to ½ of the wavelength. The above-mentioned retardation layer may be a liquid crystal polymer layer that is formed by aligning and polymerizing a polymeric liquid crystal compound or a plastic film with birefringence by a stretching or shrinking process. In an example, the retardation layer may be the plastic film with the birefringence by inclination-stretching, for example, an inclination-stretched COP film, and the like.

The polarization element may be a general element that is known in the related art. For example, the polarization element may be an element manufactured through adsorption and alignment of a dichroic dye to a polyvinyl alcohol resin.

When the LCF further includes a substrate, the homeotropic- or focal conic-aligned CLC area is preferably distributed on the side of the substrate in the CLC layer. In an example, the homeotropic- or focal conic-aligned CLC areas form a layer in a direction parallel to the upper surface of the substrate in the CLC layer and are aligned to have a predetermined thickness from the substrate of CLC layer, and a planar-aligned CLC area may be present in other areas.

In an example, the side of the substrate that has at least the CLC layer may be hydrophilic in order to form the homeotropic- or focal conic-aligned CLC areas. In an example, the side of the substrate that has at least the CLC layer may have a wetting angle of about 0° to 50°, 0° to 40°, 0° to 30°, 0° to 20°, 0° to 10°, 10° to 50°, 20° to 50°, or 30° to 50° to water. When the CLC layer is formed on the side of the substrate having the wetting angle of the above-mentioned range, the homeotropic- or focal conic-aligned CLC areas may be properly formed. A way of measuring the wetting angle of the substrate to water may include measuring the wetting angle as known in the related art, but is not limited thereto. For example, it may be measured using a DSA100 instrument available from KRUSS according to a manufacturer's manual.

In order for the substrate to have the wetting angle within the above-mentioned range, a hydrophilic treatment may be performed on the side of the substrate, or the substrate containing a hydrophilic functional group may be used as the substrate. There are various hydrophilic treatment methods of controlling the wetting angle of the substrate to be within the above-mentioned range and various substrates having the wetting angle within the above-mentioned range in the related art. The hydrophilic treatment may be, for example, a corona treatment, a plasma treatment, an alkaline treatment, and the like. Therefore, in an example, the side of the substrate may have a corona treating layer, a plasma treating layer, or an alkaline treating layer.

When the CLC layer is formed on the substrate having the wetting angle of the above-mentioned range, there is also an advantage that the alignment of the CLC layer, or the helical axis of the aligned CLC area may be controlled to a desired range without using an alignment layer that is generally used for an alignment of CLC layer. However, a known alignment layer, such as a rubbing alignment layer, a polymer alignment layer, and the like, may be formed on the side of the substrate that has the CLC layer according to necessity.

A proper surface treatment may be performed on the substrate included in the LCF. In an example, the surface-treated layer may be a surface-treated side having a dimple pattern. Therefore, the substrate may have the dimple pattern. A phenomenon causing spots and the like through contact with other parts, such as an optical film and the like, can be effectively inhibited by forming the dimple pattern properly when the haze of the LCF is further controlled, or it is applied to a display, and the like. In addition, a proper light diffusion effect can be obtained to improve an optical property, a reflection-preventing property, a luminance property, and a contrast property of a display.

The method of forming the dimple pattern may include, for example, performing a proper embossing treatment during the process of manufacturing the substrate; coating a curable resin composition on the substrate, and curing in a state of contact with a mold to give a proper concavo-convex structure; or mixing a proper bead with the curable resin composition, coating the resultant on the substrate, and curing, but is not limited thereto.

In the case of using the curable resin composition as indicated above, when a composition that can form a hard cured layer through curing is used, it is possible to give excellent abrasion resistance and scratch resistance to the substrate, and also have a dimensional stability even under severe conditions, such as, high temperature and/or high humidity.

When the dimple pattern is formed using the curable resin composition, for example, various room temperature curable, moisture curable, heat curable, or photo curable resin compositions can be used as the resin, and thus the dimple pattern may include the resin compositions in a state of curing as mentioned above. Preferably, the heat curable or photo curable resin composition may be used, and more preferably, the photo curable resin composition may be used. "A state of curing" in the above sentence may mean that the components included in the resin composition are changed to a hard state through crosslinking or polymerization of the components. In addition, the room temperature curable, moisture curable, heat curable or photo curable resin composition may refer to a composition in a state of curing that can be induced by the room temperature, the presence of proper humidity, supply of heat, or irradiation of electromagnetic waves, such as ultraviolet rays.

In an example, the resin composition may include an acrylic compound, an epoxy compound, a urethane compound, a phenol compound, a polyester compound, and the like, as a main material. A "compound" in the above sentence may be monomeric, oligomeric, or polymeric compound.

In an example, the acrylic resin composition with an excellent resistance to yellowing and the like, and an excellent optical property, such as transparency, may be used as the resin composition, and preferably the ultraviolet ray curable acrylic resin composition may be used.

The ultraviolet ray curable acrylic resin composition may include an acrylate oligomer and a diluent monomer, and a multifunctional acrylate may be used as the diluent monomer in order to secure hardness according to necessity. Examples of the acrylate oligomer may be urethane acrylate, epoxy acrylate, ester-based acrylate, ether-based acrylate, and the like, and preferably urethane acrylate may be used. There are various acrylate oligomers for preparing the ultraviolet ray curable composition in the related art, and the composition of the present invention may be properly selected as mentioned above.

Various types of diluent monomers used for preparing the ultraviolet ray curable acrylic-based resin composition are known in the related art, and one preferable example of them may be a multifunctional acrylate, but is not limited thereto. Examples of the multifunctional acrylate may include, a difunctional acrylate, such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxyl puivalic acid neopentylglycol di(meth)acrylate, dicyclopentanyl di(meth)acrylate, caprolactone denaturated dicyclopentanyl di(meth)acrylate, ethyleneoxide denaturated di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide denaturated hexahydrophthalic acid di(meth)acrylate, tricyclodecane dimethanol(meth)acrylate, neopentylglycol denaturated trimethylpropane di(meth)acrlyate, adamantane di(meth)acrylate, 9,9-bis[4-(2-acryloyloxyethoxy)phenyl]fluorine, and the like; a trifunctional acrylate, such as trimethylolpropane tri(meth)acrylate, dipentaerythritol tri(meth)acrylate, propionic acid denaturated dipentaerythritol tri(meth)acrylate, pentaerythritol tri(meth)acrylate, propyleneoxide denaturated trimethylolpropane tri(meth)acrylate, trifunctional urethane(meth)acrylate, tris(meth)acryloxyethylisocyanurate, and the like; a tetrafunctional acrylate, such as diglycerol tetra(meth)acryalte, pentaerythritol tetra(meth)acrylate, and the like; a pentafunctional acrylate, such as propionic acid denaturated dipentaerythritol penta(meth)acrylate, and the like; and a hexafunctional acrylate, such as dipentaerythritol hexa(meth)acrylate, caprolactone denaturated dipentaerythritol hexa(meth)acrylate, urethane(meth)acrylate (ex. the reactant of isocyanate monomer, trimethylolpropane tri(meth)acrylate, and the like) (ex. UA-306I or UA-306T available from Kyoeisha); and the like, and at least tetrafunctional, preferably at least hexafunctional acrylate may be used to secure hardness of the resin layer, but is not limited thereto.

A selection of the components and a mixing ratio of the selected components for preparing the ultraviolet ray curable acrylic-based resin composition are not specifically limited, and may be controlled considering a desired hardness and other properties of the resin layer.

In addition, when the dimple pattern is formed by mixing the beads with the curable resin composition as mentioned above, the beads may be preferably light-scattering beads. The term, "light-scattering beads" refers to beads that can scatter incident light inside the resin layer because they have a different refractive index from the resin layer, for example, the resin composition in a state of curing as mentioned above. In an example, a difference in refractive index between the light-scattering beads and the resin layer may be 0.03 or less, and preferably 0.02 to 0.2. When the difference in refractive index is excessively great, there are disadvantages in that the scattering is excessively generated in the resin layer, thereby greatly increasing the haze, decreasing the degree of light transmission of the resin layer; or decreasing a contrast of a display device.

The light-scattering bead may have, for example, a globular shape, an oval shape, a polyhedral shape, an amorphous shape, or other shapes, but is not specifically limited thereto. The beads or light-scattering beads may have a mean diameter of 50 nm to 5,000 nm. In an example, the beads or light-scattering beads with concavo-convex shapes on their surfaces can also be used, and specifically, the beads or light-scattering beads in which the mean surface roughness (Rz) is 10 nm to 50 nm, preferably 20 nm to 40 nm; the maximum heights of the concavo-convex shapes formed on the surface are about 100 nm to 500 nm, preferably 200 nm to 400 nm; and the width between the concavo-convex shapes may be 400 nm to 1,200 nm, preferably 600 nm to 1,000 nm may be used. The shapes of the beads or light-scattering beads are adjusted as mentioned above so that dispersion stability and compatibility can be increased in the resin layer and the number of beads per unit volume of the resin layer is properly controlled so that a desired scattering effect and desired haze value can be secured.

A specific type of the light-scattering beads is not particularly limited, as long as it meets the above-mentioned conditions, and various inorganic-based or organic-based beads can be used, and preferably, the inorganic-based beads can be used. Examples of the inorganic-based bead may include at least one selected from the group consisting of silica, amorphous titania, amorphous zirconia, indium oxide, alumina, amorphous zinc oxide, amorphous cerium oxide, barium oxide, calcium carbonate, amorphous barium titanate, and barium sulfate and examples of the organic-based beads may include a cross-linking material or non-crosslinking material of the organic-based material, such as a acrylic-based resin, a styrene resin, a urethane resin, a melamine resin, a benzoguanamine resin, an epoxy resin, a silicon resin, and the like, but are not limited thereto.

The content of the light-scattering beads is not specifically limited in the resin layer forming the dimple pattern. In an example, considering the type of the resin layer and beads, and the like, the resin layer may form the dimple pattern and also the content of the bead may be controlled to effectively control the haze value.

The resin composition may suitably include an additional agent, such as a polymerization initiator, an ultraviolet blocking agent, an absorbent, an anti-static agent, a dispersing agent, and the like.

A specific shape of the dimple pattern is not specifically limited, but in an example, the pattern may be controlled to have a haze value of about 15% or less. The haze value mentioned above may be achieved by controlling the refractive index and content of the beads in the resin layer forming the dimple pattern, or properly controlling the shape of the dimple pattern.

The substrate may be treated by various surface treatments according to necessity in addition to the above-mentioned dimple pattern. Examples of the surface treatment may be a low reflection treatment, a reflection-preventing treatment, an anti-glare treatment, and a high-resolution anti-glare treatment, and one or two more of these may be performed on the substrate. A method of performing each surface treatment is not particularly limited, but various ways that are known in the related art may be applied.

The present invention relates to a method of manufacturing the LCF. An exemplified method of manufacturing the LCF may include forming a CLC layer including a CLC area.

The forming of the CLC layer may be performed such that the CLC area includes a cholesteric-aligned CLC area of which a helical axis of a director of a CLC molecule is formed to be parallel to a thickness direction of the CLC layer and a cholesteric-aligned CLC area of which the helical axis of the director of the CLC molecule is formed not to be parallel to the thickness direction of the CLC layer. The cholesteric-aligned CLC area of which the helical axis of the director of the CLC molecule is formed not to be parallel to the thickness direction of the CLC layer may be the homeotropic- or focal conic-aligned CLC area.

A way of forming the homeotropic- or focal conic-aligned CLC area is not particularly limited, but for example, may include forming the cholesteric CLC layer on a hydrophilic surface of the substrate having the wetting angle mentioned above, or adding a proper additional agent to the liquid crystal composition that is used in order to form the CLC layer.

In an example, forming the CLC layer may include coating a CLC composition on the surface of the substrate having a wetting angle of 0° to 50°, 0° to 40°, 0° to 30°, 0° to 20°, or 0° to 10° to form the CLC layer. The substrate having the wetting angle mentioned above may be a substrate having the surface that is properly hydrophilic-treated, or a substrate having the innate hydrophilic property because it includes a hydrophilic functional group.

The hydrophilic treatment may include, for example, a corona treatment, a plasma treatment, an alkaline treatment, and the like. The treating conditions are not particularly limited. Various methods of giving the hydrophilic property to the substrate are known in the related art, and the hydrophilic treatment may be performed to allow the substrate to exhibit the wetting angle through the various methods mentioned above.

The CLC composition is coated on the side having the above-mentioned wetting angle to form the CLC layer. The term, "CLC composition" may include all kinds of compositions that can be used to form the CLC layer including the liquid crystal area in a desired pattern.

In an example, the composition may include a nematic liquid crystal compound and the chiral agent. In addition, the composition may further include an initiator or a crosslinking agent for polymerization or crosslinking of the compound represented by Chemical Formula 1. The proper polymerization initiator may include things that can generate free radicals in order to initiate and propagate the polymerization or crosslinking. A free radical initiator may be selected, for example, according to stability or a half-life. Preferably, the free radical initiator does not generate an additional color to the CLC layer through absorption or otherwise. The free radical initiator is typically a thermal free radical initiator or a photoinitiator. The thermal free radical initiator includes, for example, peroxide, persulfate, or azonitrile compounds. The free radical initiator produces free radicals when performing thermal degradation.

The photoinitiator may be activated by electromagnetic radiation or particle irradiation. Examples of proper photoinitiators may include an onium salt photoinitiator, an organic metal photoinitiator, a cationic metal salt photoinitiator, photodegradable organic silane, potential sulfonate, phosphine oxide, cyclohexyl phenylketone, amine substituted acetophenone, and benzophenone. Generally, different light sources may be used, but UV irradiation may be used in order to activate the photoinitiator. The photoinitiator may be selected based on the absorption of a specific wavelength of the light.

The CLC composition may be a part of a coating composition typically including at least one solvent. The coating composition may include, for example, a dispersing agent, an antioxidant, and an antiozonant. Additionally, the coating composition may include various dyes and pigments in order to absorb ultraviolet rays, infrared rays, or visible rays, as required. In several cases, it may be preferable to add a viscosity modifier, such as a thickener and filler.

The CLC composition may be applied to the substrate by all kinds of liquid-coating methods, for example. In some embodiments, after coating, the CLC composition is crosslinked, polymerized, or converted to the CLC layer. The conversion may be achieved by evaporation of a solvent and heating for alignment of the CLC composition; crosslinking or polyemrization of the CLC composition; or, for example, supplying heat, such as actinic irradiation; irradiation of light such as ultraviolet rays, visible rays, or infrared rays, and the like, and irradiation of electron beams, a combination thereof, or various techniques including curing of a CLC composition used with similar techniques.

In an example, the CLC composition may include a compound of Chemical Formula 1, an initiator, and a chiral agent.

As the initiator, things that can initiate a polymerization or crosslinking of the compound of Chemical Formula 1 may be selected. As the initiator, the photoinitiator may include at least one or two selected from the group consisting of 2-methyl-1-[4-(methylthio)phenyl]-2-(4-morpholinyl)-1-propanone(2-methyl-1-[4-(methylthio)phenyl]-2-(4-morpholinyl)-1-propanone), 2-dimethoxy-1,2-diphenylethan-1-one, 1-hydroxy-cyclohexyl-phenyl-ketone, triaryl sulfonium hexafluoroantimonate salts, diphenyl(2,4,6-trimethylbenzoyl)-phosphine oxide, and the like, but is not limited thereto. The CLC composition may include the initiator in a ratio of 0.1 parts by weight to 10 parts by weight based on 100 parts by weight of the compound of Chemical Formula 1. The polymerization and crosslinking of the liquid crystal can be effectively induced and decrease of the physical properties due to the remaining initiator after the polymerization and crosslinking can be prevented by controlling the content of the initiator as mentioned. For the present specification, the unit parts by weight may mean the ratio of weight, unless the definition is specifically indicated otherwise.

The above-mentioned kinds of compounds may be used as the chiral agent. The CLC composition may include the chiral agent in a ratio of 1 part by weight to 10 parts by weight based on 100 parts by weight of the compound of Chemical Formula 1. The chiral agent may effectively induce a helical twist of the CLC by controlling the content as mentioned above.

The CLC composition may further include a solvent according to necessity. The solvent may include, for example, halogenated hydrocarbons, such as chloroform, dichloromethane, tetrachloroethane, trichloroethylene, tetrachloroethylene, chlorobenzene, and the like; aromatic hydrocarbons, such as benzene, toluene, xylene, methoxy benzene, 1,2-dimethoxybenzene, and the like; alcohols, such as methanol, ethanol, propanol, isopropanol, and the like; ketones, such as acetone, methylethylketone, methylisobutylketone, cyclohexanone, cyclopentanone, and the like; cellosolves, such as methylcellosolve, ethylcellosolve, butylcellosolve, and the like; ethers, such as diethylglycol dimethylether (DEGDME), dipropyleneglycol dimethylether (DPGDME), and the like; etc. In addition, the content of the solvent is not particularly limited, and may be properly selected in consideration of coating efficiency, drying efficiency, and the like.

In addition, the CLC composition may further include a surfactant. The surfactant is distributed on the surface of the liquid crystal to allow the surface to be even, and also enables the alignment of liquid crystal to stabilize, thereby maintaining the smooth surface of the film after forming the CLC layer, so that it can improve the quality of the appearance.

The surfactant may include, for example, a fluorocarbon-based surfactant and/or a silicon-based surfactant. The fluorocarbon-based surfactant may be Fluorad FC4430™, Fluorad FC4432™, and Fluorad FC4434™ that are available from 3M, Zonyl available from Dupont, and the like, and the silicon-based surfactant may be BYK™ available from BYK-Chemie, and the like. The content of the surfactant is not particularly limited, but may be properly selected in consideration of coating efficiency, drying efficiency, and the like.

For the method of manufacturing, the coating of the CLC composition to form the CLC layer may include, for example, irradiating ultraviolet ray to a coating layer of the CLC composition to form a concentration gradient of the chiral agent in the coating layer; and curing the coating layer formed with the concentration gradient of the chiral agent.

When a relatively low level of ultraviolet ray is irradiated to the coating layer of the CLC composition at a predetermined temperature, the concentration gradient of the chiral agent may be induced in the coating layer, that is, the change of the concentration of the chiral agent may be induced along the predetermined direction in the coating layer. In an example, the concentration gradient of the chiral agent may be formed along a thickness direction of the coating layer. The irradiation of ultraviolet ray to form the concentration gradient of the chiral agent may be performed at a range of temperature, for example, 40° C. to 80° C., 50° C. to 70° C., or around 60° C. In addition, the irradiation of ultraviolet ray for the formation of the concentration gradient may be performed by irradiating the ultraviolet ray having a wavelength of UV A at an intensity of radiation of about 10 mJ/cm² to 500 mJ/cm².

After forming the concentration gradient as mentioned above, sufficient ultraviolet ray to polymerize the components of the composition may be irradiated to form the CLC layer. According to the irradiation of ultraviolet ray, the liquid crystal may be fixed to have a different pitch according to the concentration gradient of the chiral agent that is formed so that the coating layer can form the CLC area. A condition of the strong ultraviolet ray is not particularly limited as long as the polymerization of the components of the composition is sufficiently performed. In an example, the irradiation of the ultraviolet ray may be performed by irradiating the ultraviolet ray having a wavelength of UV A to C at an intensity of radiation of about 1 J/cm² to 10 J/cm².

The homeotropic- or focal conic-alignment may be formed as mentioned above, or the CLC layer having a wideband property can be effectively formed.

The present invention relates to an optical device. The optical device may include the LCF, and a λ/4 wavelength layer arranged on at least one side of the LCF. In an example, the optical device may be used as a reflective polarization plate.

A polymer film or an LCF may be used as the λ/4 wavelength layer, for example, and may have a single layer or multi layer structure. The polymer film may include a film including polyolefin, such as polycarbonate (PC), norbornene resin, poly(vinyl alcohol) (PVA), polystyrene (PS), poly(methyl methacrylate) (PMMA), polypropylene (PP), and the like, poly(arylate) (PAR), polyamide (PA), poly(ethylene terephthalate) (PET), polysulfone (PS), and the like. The polymer film may be used as the λ/4 wavelength layer having birefringence through stretching or shrinking under the proper conditions.

The λ/4 wavelength layer may be a liquid crystal layer. In an example, the liquid crystal layer that is the λ/4 wavelength layer is formed on the surface of the substrate. In addition, an alignment layer may be present between the substrate and the liquid crystal layer.

The alignment layer or the substrate of the liquid crystal layer that is the λ/4 wavelength layer or a type of the liquid crystal to form the λ/4 wavelength layer is not particularly limited. In an example, the substrate of the above-mentioned CLC layer, for example, an optically isotropic substrate, and the like, may be used as the substrate. A known alignment layer, such as an optical alignment layer, a rubbing alignment layer, and the like, may be used as the alignment layer. In addition, considering a lower alignment layer, a desired phase difference property, and the like, a proper material may be used as the liquid crystal, and for example, Reactive Mesogen (RM) available from Merck, LC242 available from BASF, and the like may be exemplified.

The liquid crystal layer that is the λ/4 wavelength layer may be formed by (a) forming an alignment layer on a substrate; (b) coating and aligning a polymeric liquid crystal compound on the alignment layer; and (c) polymerizing the aligned liquid crystal compound.

The optical device may be implemented in various structures. FIGS. 5 to 12 illustrate an exemplified structure of the polarization plate.

In an example, the optical device 5 may include a first substrate 54, a λ/4 wavelength layer 53 that is formed on one side of the first substrate 54, the CLC layer 52 adhered to the λ/4 wavelength layer 53, and a second substrate 51, as shown in FIG. 5. In the structure of FIG. 5, the λ/4 wavelength layer 53 may be the liquid crystal layer and the λ/4 wavelength layer 53 may be formed in a state to be adhered to the CLC layer 52. The first substrate 54 or the second substrate 51 may be equally applied as mentioned above. In the structure of FIG. 5, the homeotropic- or focal conic-aligned CLC area mentioned above may be present in the CLC layer 52, or the above-mentioned haze layer may be formed on one side of the first substrate 54 or the second substrate 51 so that the haze of the overall film can be controlled.

In FIG. 6, an exemplified optical device 6 has a structure in which the λ/4 wavelength layer 53 and the CLC layer 52 are formed on both sides of one substrate 61. The same substrate as the substrate on which the CLC layer or the λ/4 wavelength layer is formed may be used as the substrate 61. In the structure of FIG. 6, the homeotropic- or focal conic-aligned CLC area mentioned above may be present in the CLC layer 52, or the above-mentioned haze layer may be formed on one side of the λ/4 wavelength layer 53 or the CLC layer 52 so that the haze of the overall film can be controlled.

In FIG. 7, an exemplary optical device 7 has a structure in which the CLC layer 52 and the λ/4 wavelength layer 53 are formed on one substrate 71 in order. The same substrate as the substrate on which the CLC layer or the λ/4 wavelength layer is formed may be used as the substrate 71. In the structure of FIG. 7, the homeotropic- or focal conic-aligned CLC area mentioned above may be present in the CLC layer 52, or the above-mentioned haze layer may be formed on one side of the λ/4 wavelength layer 53 or the substrate 71 so that the haze of the overall film can be controlled.

In FIG. 8, an exemplified optical device 8 has a structure in which the λ/4 wavelength layer 53 and the CLC layer 52 are formed on one substrate 81 in order. The same substrate as the substrate on which the CLC layer or the λ/4 wavelength layer is formed may be used as the substrate 81. In the structure of FIG. 8, the homeotropic- or focal conic-aligned CLC area mentioned above may be present in the CLC layer 52, or the above-mentioned haze layer may be formed on the CLC layer 52 or the substrate 81 so that the haze of the overall film can be controlled.

The exemplified optical devices shown in FIG. 5 to FIG. 8 may be integrated with a polarization element to form the optical devices. Generally, the polarization plate used for an LCD and the like includes a polarization element, such as a PVA-based polarization element, and also a protection film that is formed on one side or both sides of the polarization element.

In an example, for the structures of the exemplified optical devices shown in FIGS. 5 to 8, an integral optical device can be implemented by adhering a protection film of the polarization plate to the optical device or using the protection film of the polarization plate as the substrate. When constituting the integral element, the polarization element may be constituted to be arranged on the upper side of the λ/4 wavelength layer. FIGS. 9 to 12 show integral optical devices using the structures of the optical devices corresponding to FIGS. 5 to 8, respectively. Each case includes the polarization element 91, such as a PVA-based polarization element, and the like.

Also, the present invention relates to an LCD. An exemplified LCD may include the optical device.

In an example, the LCD may further include a liquid crystal panel, and a light source arranged on one side of the liquid crystal panel, and the optical device may be arranged between the liquid crystal panel and the light source. In addition, for the optical device, the LCF may be arranged so that the light source is located closer than the λ/4 wavelength layer.

As exemplified in FIG. 13, the LCD 13 may include, for example, a liquid crystal panel 132, of which polarization plates 131, 133 are arranged on both upper and lower sides; and a light source 135 that is arranged at the lower side of the lower polarization plate 133, wherein the optical device 134 may be arranged between the lower polarization plate 133 and the light source 135.

The optical device 134 may include a CLC layer 1342 and a λ/4 wavelength layer 1341, and the CLC layer 1342 may be arranged so that the light source 135 is closer than the λ/4 wavelength layer 1341.

In the above structure, the CLC layer 1342 of the optical device 134 may allow partial light emitted from the light source 135 to penetrate to supply the light to the lower polarization plate 133 and to reflect the rest of the light to the light source 135. The light supplied to the lower polarization plate 133 may be converted to a linear polarization by the λ/4 wavelength layer 1341 to be delivered to the upper side. In that case, the light reflected by the CLC layer 1342 may be re-reflected in a device and the polarization property may be changed to be again incident to the polarization plate 134. Through a repetition of the above process, a luminance property of the device can be improved.

In an example, when the optical device is implemented as an integral structure with the polarization element, the optical device with the integral structure may be located at the area in which the polarization plate 133 and the optical device 134 are present in FIG. 13 instead of the polarization plate 133 and the optical device 134.

Even in that case, the device may be arranged so that the light emitted from the light source 135 is first incident to the CLC layer in the optical device with the integral structure, part of the light is reflected and the rest of the light is penetrated, and the penetrated light penetrate the λ/4 wavelength layer and the polarization element in the element in order to be incident to the liquid crystal panel 132.

Other parts or structures, and the like are not particularly limited as long as the LCD includes the optical device, and all the contents that are known in the related art may be properly applied.

The exemplified LCF according to the present invention may be used as a reflective polarization plate that can improve luminance and light utilization efficiency of a display device, such as an LCD, and the like. Especially, the LCF includes a homeotropic- or focal conic-aligned CLC area in the liquid crystal layer, thereby maximizing an effect on improving luminance, and also effectively reproducing color coordinates of a light source to provide a display device with an excellent image quality.

DETAILED DESCRIPTION OF EXEMPLARY EMBODIMENTS

Figure 1:
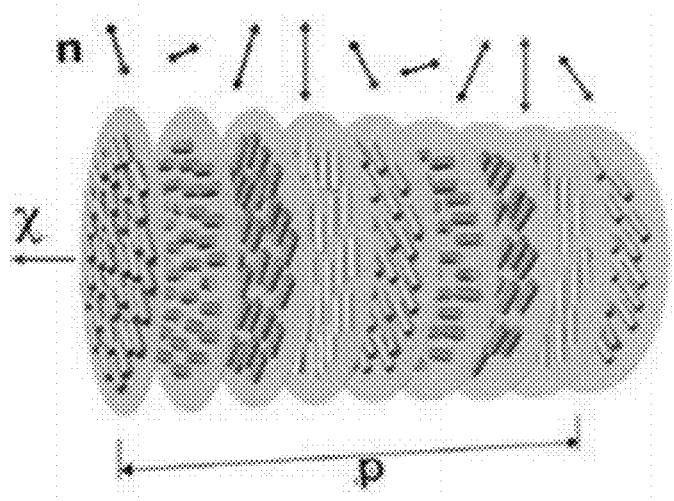
FIG. 1 is an exemplified diagram illustrating a CLC.
Figure 2:
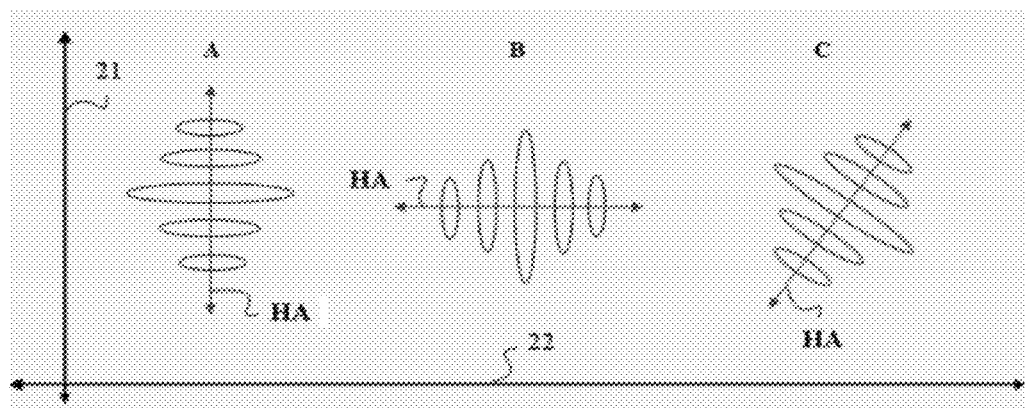
FIG. 2 is an exemplified diagram illustrating an alignment of the CLC.
Figure 3:
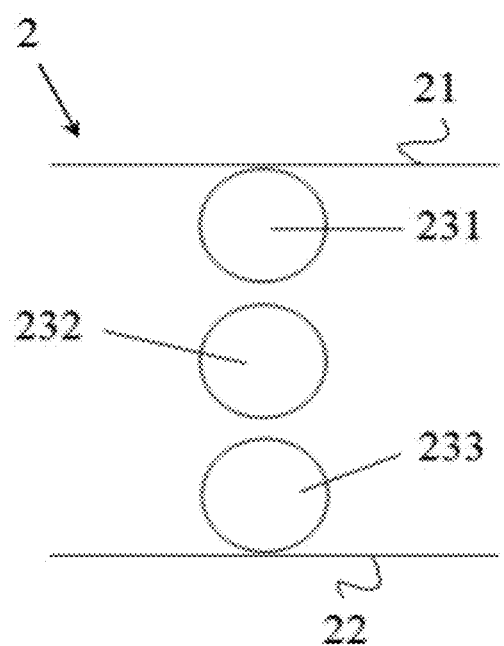
FIG. 3 is a diagram showing an arrangement of a CLC area in a CLC layer by way of example.
Figure 4:
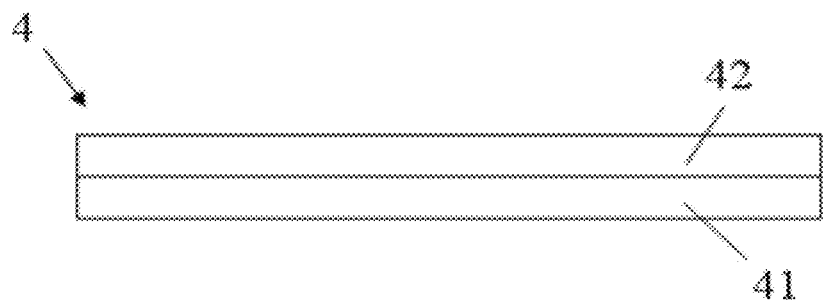
FIG. 4 is a diagram showing an exemplified LCF.
Figure 5:
FIG. 5 to FIG. 12 are diagrams showing an exemplified optical device.
Figure 6:
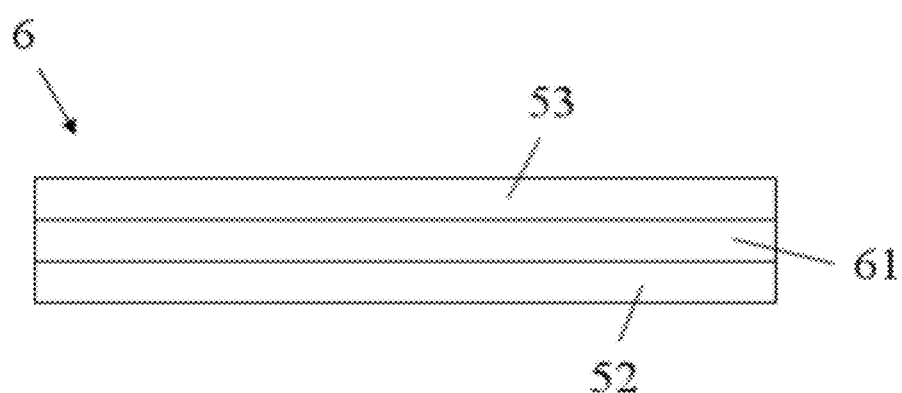
Figure 7:
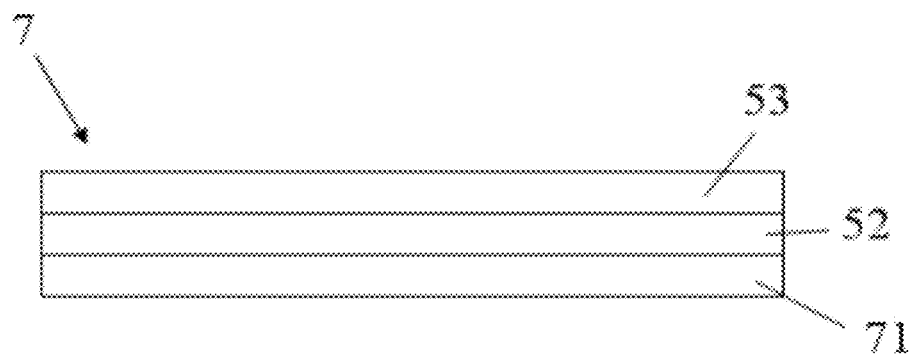
Figure 8:
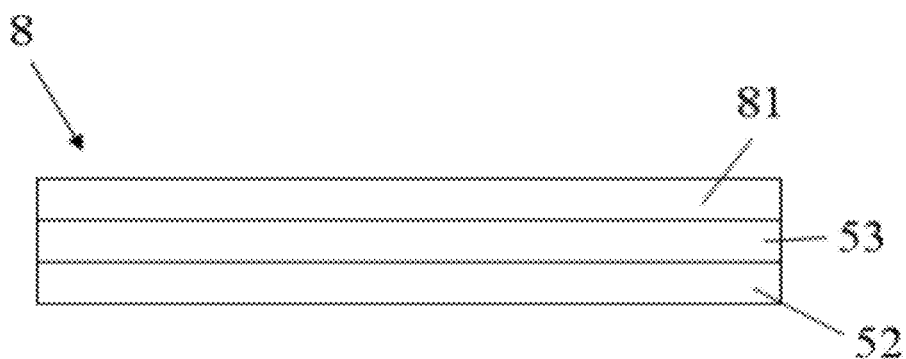
Figure 9:
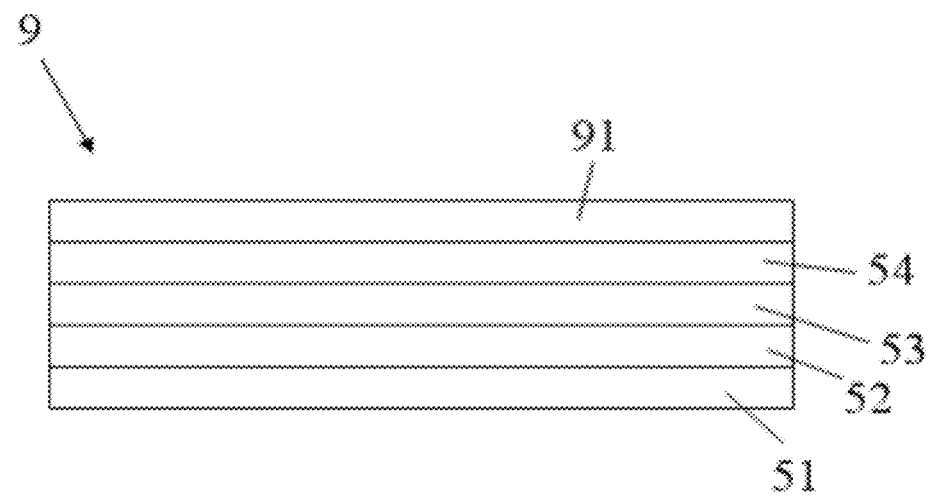
Figure 10:
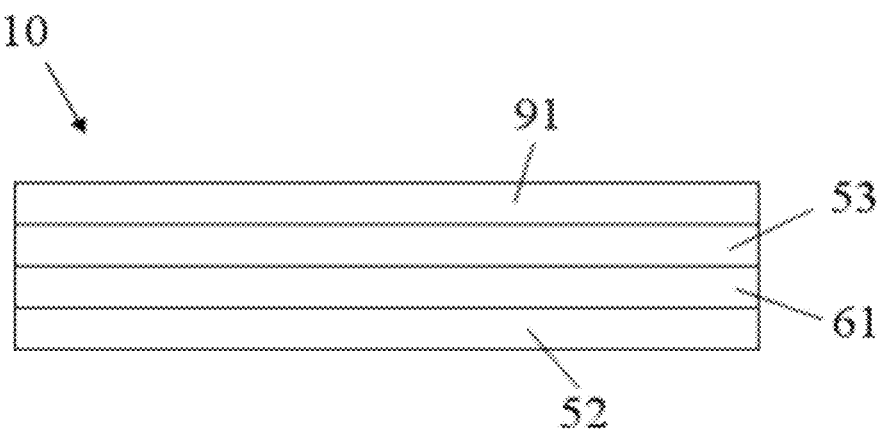
Figure 11:
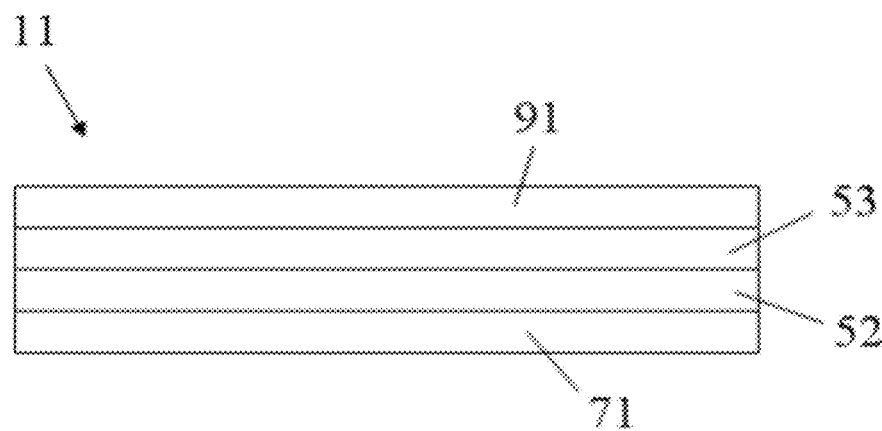
Figure 12:
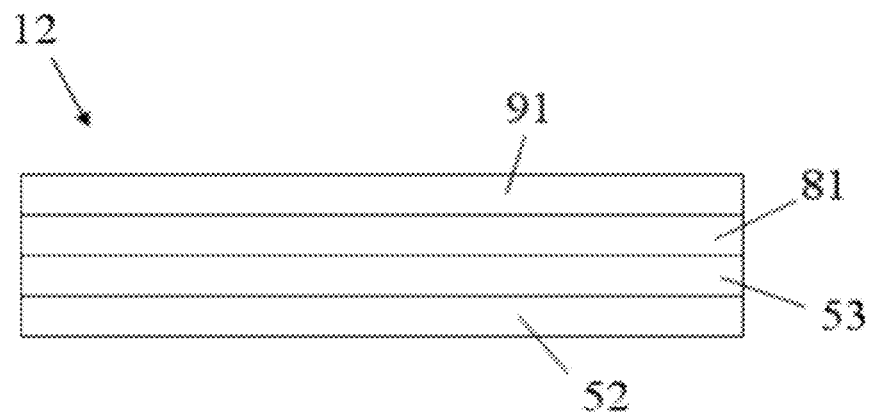
Figure 13:
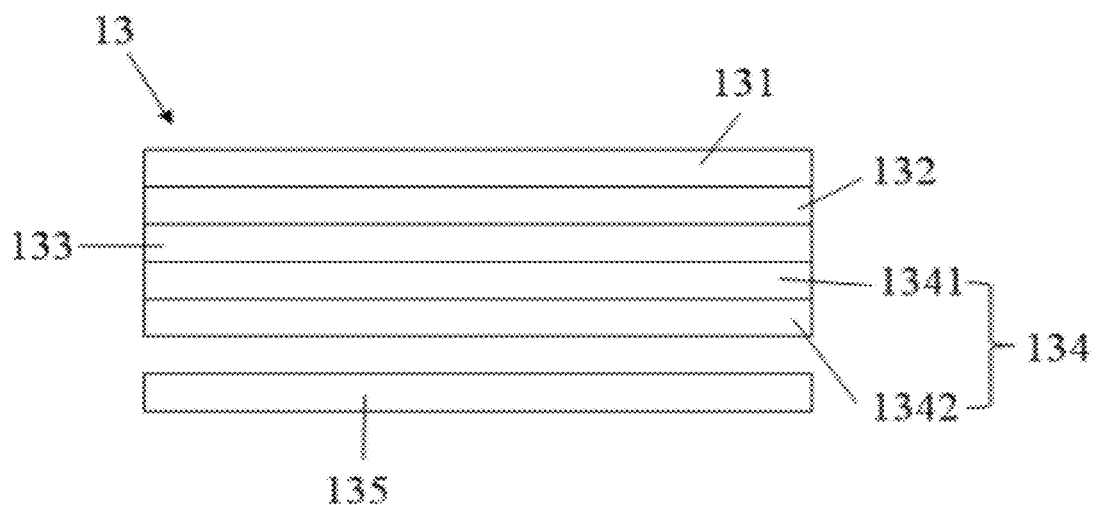
FIG. 13 is a diagram showing an exemplified LCD.

Hereinafter, the LCF will be described in further detail with reference to Example and Comparative Example, but the range of the LCF is not limited to the following Example.

Preparation Example 1

Preparation of CLC Composition (A)

A CLC composition was prepared by dissolving RMM856 that is a CLC mixture available from Merck in a mixed solvent of toluene and cyclohexanone (weight ratio=7:3 (toluene:cyclohexanone)) to be about 40 wt % of solid; heating at 60° C. for 1 hour in order to prepare a homogenous solution; and sufficiently cooling.

Example 1

Manufacture of LCF

A substrate layer with a hydrophilic surface was manufactured by performing a corona treatment for 5 seconds under the conditions of 300 watts on one side of a PET (MRL38, available from Mitsubishi) substrate. A wetting angle of the PET substrate to water was about 60°, and a wetting angle of the hydrophilic surface to water was controlled to be about 30° to 40° through irradiation of ultraviolet rays. Then, a CLC composition (A) was coated on the hydrophilic surface of the substrate layer with a wire bar, and then dried at 100° C. for 2 minutes to manufacture a liquid crystal layer with a thickness of about 5 μm. Then, a concentration gradient of a chiral agent was induced by irradiating ultraviolet rays within a wavelength range of 350 nm to 400 nm using an ultraviolet ray irradiating apparatus (TLK40W/10R available from Philips) to the coating layer that was dried at a temperature of about 60° C. (intensity of irradiation: about 100 mJ/cm$^2$). After inducing the concentration gradient, the ultraviolet rays were again irradiated using the ultraviolet rays irradiating apparatus (Fusion UV, 400W) in order to sufficiently cure the composition to polymerize the coating layer and manufacture a CLC layer, thus manufacturing an LCF. A haze value of the LCF manufactured by the above process was measured with a hazemeter (HR-100) available from Sepung, and as a result, the haze value was about 10%. From the above results, it could be found that a homeotropic- and/or focal conic-aligned CLC areas were properly manufactured in the CLC layer.

Manufacture of Reflective Polarization Plate

The CLC layer of the LCF manufactured by the above processes was in contact with a λ/4 wavelength layer to manufacture a reflective polarization plate. A λ/4 wavelength layer that has an alignment layer and a liquid crystal layer on one side of a TAC substrate in order was used as the λ/4 wavelength layer, and the liquid crystal layer of the λ/4 wavelength layer was in contact with the CLC layer with an adhesive to manufacture the reflective polarization plate.

Comparative Example 1

An LCF and a reflective polarization plate were manufactured using the same method as in Example 1, except that a PET substrate on which a corona treatment was not performed was used. A haze value of the LCF manufactured by the above process was measured with a hazemeter (HR-100) available from Sepung, and as a result, a haze value was about 2%.

Experiment Example 1

Measurement of Transmittance According to Wavelength

Figure 14:
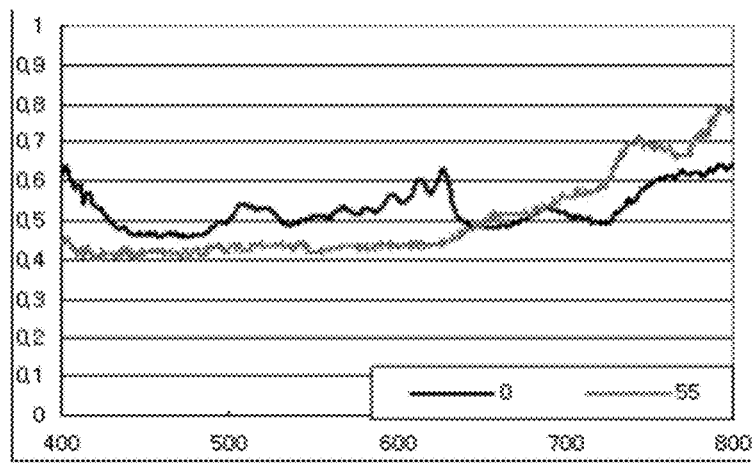
FIG. 14 and FIG. 15 are diagrams showing results of measuring optical transmittances in Example and Comparative Example.
Figure 15:
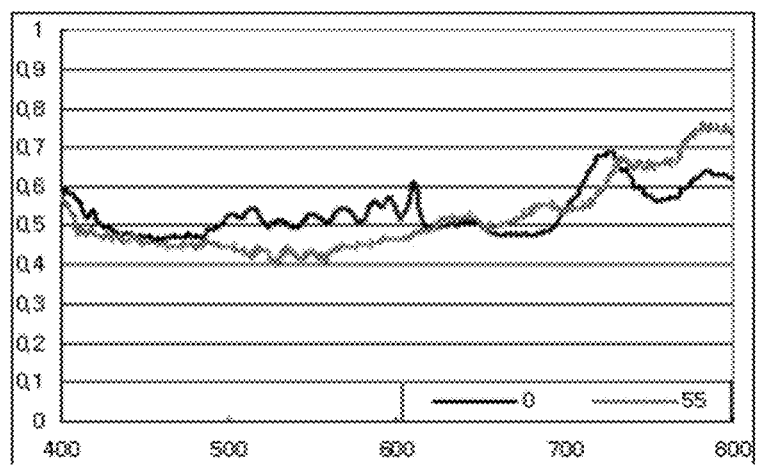

Wideband reflecting properties of the LCFs manufactured from Example 1 and Comparative Example 1 were confirmed using an Axo Scan apparatus available from Axo Metrics, and the results thereof are shown in FIGS. 14 and 15, respectively. FIG. 14 shows the result of Example 1 and FIG. 15 shows the result of Comparative Example 1, and an x axis of each figure is a wavelength, and a y axis of each figure is a transmittance. In addition, lines marked with "0" in FIGS. 14 and 15 are the results measured from the front and lines marked with "55" are the results measured from a 55° angle of inclination. From the results of FIGS. 14 and 15, it can be confirmed that a stable wideband property was shown at the front and angle of inclination in Example.

Experiment Example 2

Measurement of x and y Properties of CIE

While a light source was irradiated to the CLC layer of the manufactured reflective polarization plate, x and y values of CIE of the light emitted through the CLC layer were measured using the manufacturer's manual with an EZ Contrast apparatus available from Eldim, and are shown in the following Table 1:

TABLE 1

| | CIE Coordinates | | | |
|---|---|---|---|---|
| | Light Source | | After Penetration | |
| | x | y | x | y |
| Example 1 | 0.261 | 0.265 | 0.261 | 0.268 |
| Ref. | 0.261 | 0.265 | 0.265 | 0.269 |

Ref.: Value to Dual Brightness Enhancement Film on the market

[Explantaion of Marks]

n: CLC Director
P: Pitch
X, HA: Helical Axis
21: Thickness direction of Liquid Crystal Layer
22: Perpendicular Direction to Thickness direction of Liquid Crystal Layer
2: CLC Layer
231, 232, 233: CLC Area
4: LCF
41, 51, 54, 61, 71, 81: Substrate
21, 22: Main Surface of CLC Layer
41: CLC Layer

[Explantaion of Marks]

5, 6, 7, 8, 9, 10, 11, 12: Reflective Polarization Plate
52, 1342: CLC Layer
53, 1341: λ/4 Wavelength Layer
13: LCD
131, 133: Polarization Plate
134: Reflective Polarization Plate
135: Light Source
91: Polarization Element
132: Liquid Crystal Panel

What is claimed is:

1. A liquid crystal film comprising a liquid crystal layer that has a haze value of at least 5% and that comprises a cholesteric-aligned liquid crystal area, of which a helical axis of a director of a cholesteric liquid crystal molecule is formed parallel to a thickness direction of the liquid crystal layer, and a cholesteric-aligned liquid crystal area, of which the helical axis is formed not to be parallel to the thickness direction of the liquid crystal layer.

2. The liquid crystal film of claim 1, wherein the liquid crystal layer comprises at least two types of cholesteric-aligned liquid crystal areas, of which center wavelengths of reflected light are different from each other.

3. The liquid crystal film of claim 1, wherein the liquid crystal layer includes a compound represented by the following Chemical Formula 1 in a crosslinked or polymerized form:

[Chemical Formula 1]

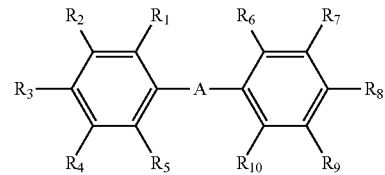

where, A is a single bond, —COO—, or —OCO—; and $R_1$ to $R_{10}$ are independently hydrogen, a halogen, an alkyl group, an alkoxy group, a cyano group, a nitro group, —O-Q-P, or a substituent of the following Chemical Formula 2, respectively, with the proviso that at least one of $R_1$ to $R_{10}$ is —O-Q-P or a substituent of the following Chemical Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

[Chemical Formula 2]

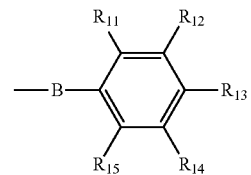

where, B is a single bond, —COO—, or —OCO—; and $R_{11}$ to $R_{15}$ are independently hydrogen, a halogen, an alkyl group, an alkoxy group, a cyano group, a nitro group, or —O-Q-P, respectively, with the proviso that at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

4. The liquid crystal film of claim 3, wherein the liquid crystal layer further comprises a chiral agent.

5. The liquid crystal film of claim 1, wherein the liquid crystal layer has a thickness of 3 µm to 8 µm.

6. The liquid crystal film of claim 1, further comprising a substrate, the liquid crystal layer being formed on at least one side of the substrate.

7. The liquid crystal film of claim 6, wherein the cholesteric-aligned area, of which the helical axis of the director of the cholesteric liquid crystal molecule is aligned not to be parallel to the thickness direction of the liquid crystal layer, is distributed on the side of the substrate in the liquid crystal layer.

8. The liquid crystal film of claim 6, wherein the side of the substrate on which the liquid crystal layer is formed has a wetting angle of 0° to 50° to water.

9. A method of manufacturing a liquid crystal film of claim 1, comprising forming a liquid crystal layer having a haze value of at least 5% and having a cholesteric-aligned liquid crystal area, wherein the liquid crystal layer comprises a cholesteric-aligned liquid crystal area, of which a helical axis of a director of a cholesteric liquid crystal molecule is formed parallel to a thickness direction of the liquid crystal layer, and a cholesteric-aligned liquid crystal area, of which the helical axis is formed not to be parallel to the thickness direction of the liquid crystal layer.

10. The method of claim 9, wherein the forming of the liquid crystal layer comprises coating a cholesteric liquid crystal composition on the side of a substrate with a wetting angle of 0° to 50° to water.

11. An optical device, comprising the liquid crystal film according to claim 1;
and a k/4 wavelength layer that is formed on an upper side of a liquid crystal layer of the liquid crystal film.

12. The optical device of claim 11, wherein the $\lambda/4$ wavelength layer comprises a substrate; an alignment layer that is formed on an upper side of the substrate; and a liquid crystal layer that is formed on an upper side of the alignment layer, and the liquid crystal layer of the $\lambda/4$ wavelength layer is in contact with the liquid crystal layer of the liquid crystal film.

13. The optical device of claim 11, further comprising a polarization element that is arranged on an upper side of the $\lambda/4$ wavelength layer.

14. A liquid crystal display device, comprising the optical device according to claim 11.

15. The liquid crystal display device of claim 14, comprising a liquid crystal panel, and a light source that is arranged on one side of the liquid crystal panel, wherein the optical device is arranged between the liquid crystal panel and the light source.

16. The liquid crystal display device of claim 15, wherein the optical device is arranged so that an liquid crystal film is located closer to the light source than a $\lambda/4$ wavelength layer.

17. The liquid crystal film of claim 1, wherein the liquid crystal layer has a haze value of 5% to 30%.

* * * * *